United States Patent [19]

Norman, II

[11] Patent Number: 5,129,695
[45] Date of Patent: Jul. 14, 1992

[54] VEHICLE SIDE PROTECTOR

[76] Inventor: Charles E. Norman, II, 408 W. Grand Ave., #E, Alhambra, Calif. 91801

[21] Appl. No.: 702,416

[22] Filed: May 20, 1991

[51] Int. Cl.⁵ .............................................. B60J 11/00
[52] U.S. Cl. ..................................... 293/128; 280/770
[58] Field of Search ................ 293/128, 126; 280/770; 296/136

[56] References Cited

U.S. PATENT DOCUMENTS

| | | | |
|---|---|---|---|
| 2,675,983 | 4/1954 | King | 293/128 X |
| 3,563,594 | 2/1971 | London | 293/128 |
| 4,014,583 | 3/1977 | Forbes | 293/128 |
| 4,561,685 | 12/1985 | Fischer | 293/128 |
| 4,596,418 | 6/1986 | Koh | 295/136 |
| 4,639,027 | 1/1987 | Boyd | 280/770 X |
| 4,708,380 | 11/1987 | Cruz | 293/128 |
| 4,718,711 | 1/1988 | Rabbit | 296/136 |
| 4,750,767 | 6/1988 | Barnett | 293/128 |
| 4,958,881 | 9/1990 | Piros | 296/136 X |

Primary Examiner—Margaret A. Focarino
Assistant Examiner—Joseph D. Pape
Attorney, Agent, or Firm—Boniard I. Brown

[57] ABSTRACT

A flexible bump protector panel is attachable to the outer surface of an automobile door to prevent its being dented or nicked by the doors of nearby vehicles. A flexible flap extends from the lower edge of the panel for disposition about the door lower edge. One or more flexible straps is/are attached to the flap and to the panel upper edge for extension over the door upper edge. The straps can be tensioned prior to door closure for clamping engagement with the door.

4 Claims, 2 Drawing Sheets

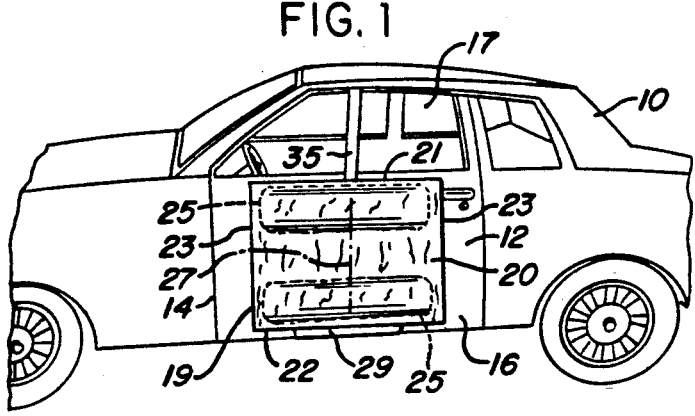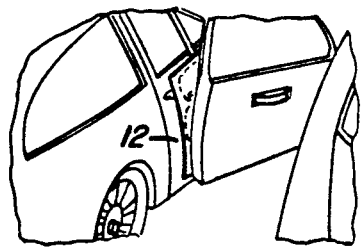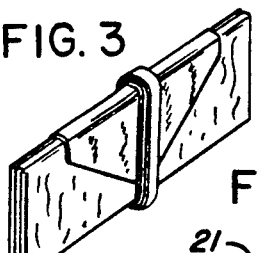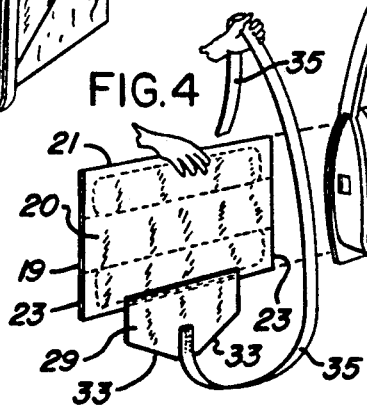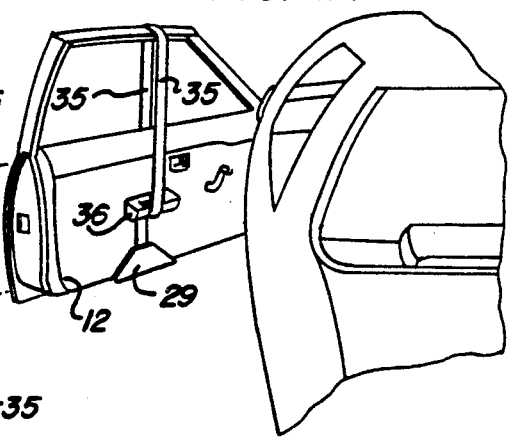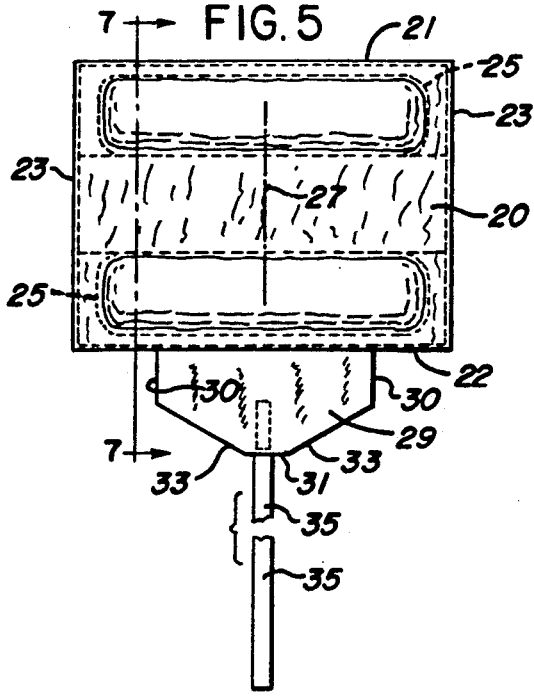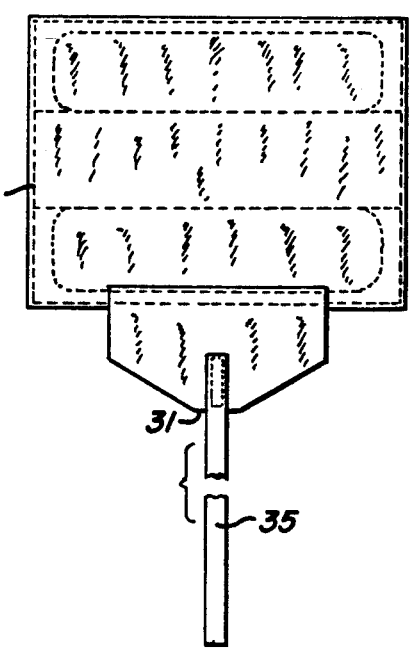

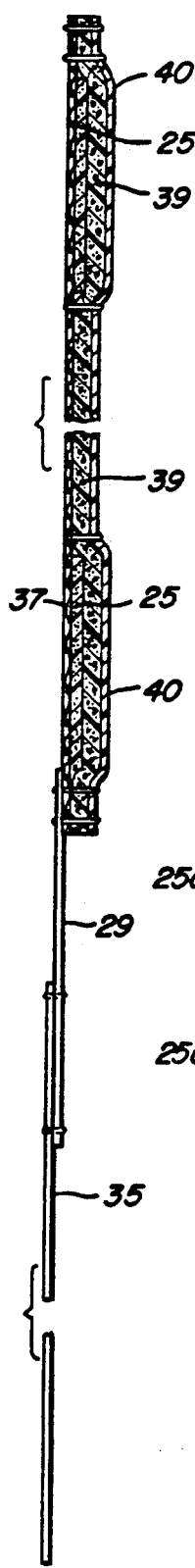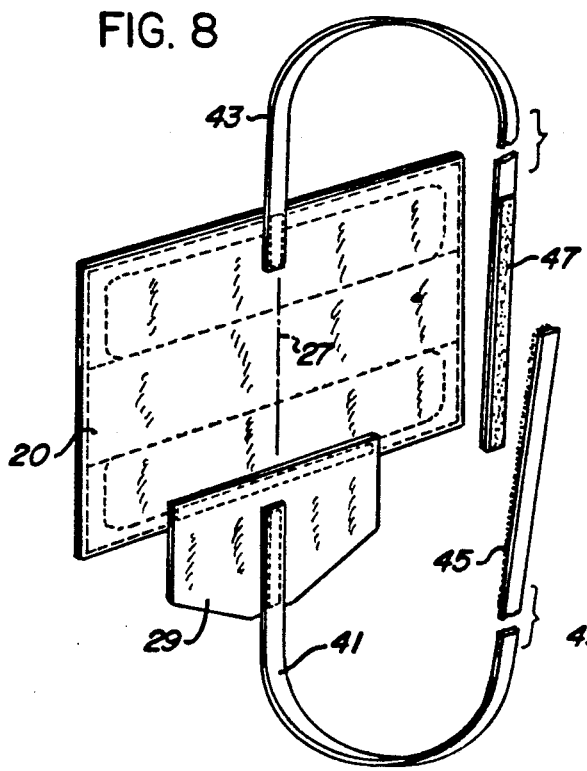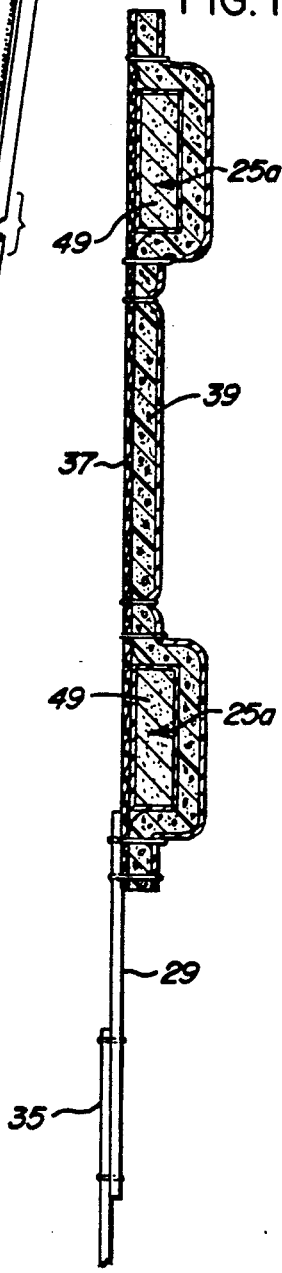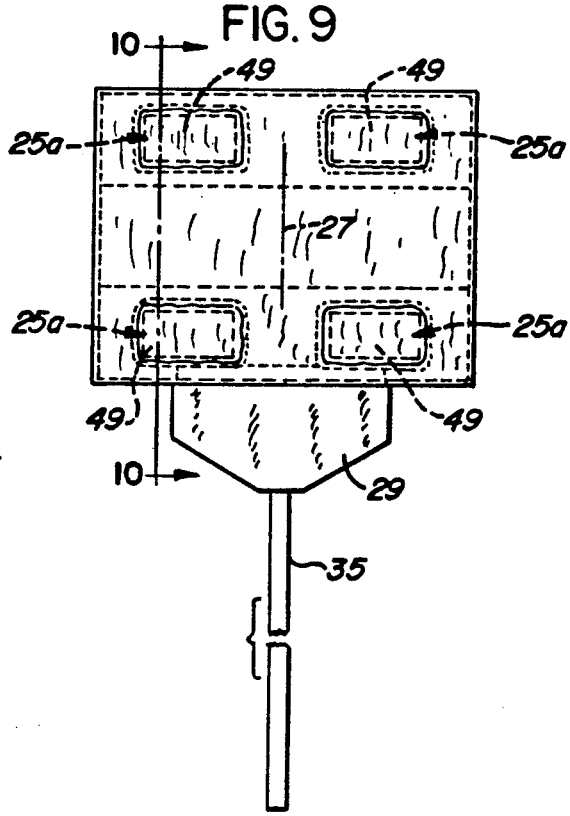

VEHICLE SIDE PROTECTOR

BACKGROUND AND SUMMARY OF THE INVENTION

The present invention relates to a bump protector attachable to the outer side surface of an automobile door to protect the door surface from dents and nicks caused by the opening of doors and adjacent automobiles. The bump protector of this invention has some features which are similar to bump protectors shown in U.S. Pat. No. 4,014,583 to Forbes, U.S. Pat No. 4,750,767 to Barnett, U.S. Pat. No. 4,810,015 to McNeil, and U.S. Pat. No. 4,643,471 to Fishback.

The bump protector of the invention is designed especially for ease of installation and for firm retention on an outer side surface of an automobile door. The protector may comprise a flexible rectangular panel having a resilient cushionerpad means therein and substantially coextensive in area with the panel, thus to make the entire panel area effective for protection against denting or nicking of the door surface. Typically, the panel can have a side-to-side dimension of about thirty inches and a vertical dimension of about twenty inches. The panel is large enough to cover the major metallic portion of an automobile door below the side window area.

Two attachment mechanisms retain the flexible panel on the door surface. One attachment mechanism can comprise two flexible magnetic tapes extending within the panel interior space along the panel upper and lower edges. Each tape has a length substantially the same as the side-to-side dimension of the panel, thus to prevent unrolling or detachment of the panel material from the door surface. The magnetic tapes are magnetically attracted to the metal (steel) door surface for releasable securemet of the panel.

A second attachment mechanism comprises a flexible flap extending downwardly from the lower edge of the protector panel for disposition along and about the door lower edge. A strap extends from the free edge of the flap for disposition along the inner side surface of the door. In one contemplated arrangement, the strap is long enough to extend upwardly from the flap over the upper edge of the door and onto the exterior side surface of the door. Upon the closing of the door, the flap and the strap are automatically clamped between the door edges and associated jamb surfaces.

In a second proposed arrangement there are two straps, one extending upwardly from the flap along the door inner surface, while the second strap extends from the upper edge of the protector panel over and about the upper edge of the door. In this arrangement, the free end portions of the straps overlap one another at an intermediate point along the door inner surface. Adhesive connector mechanisms on the overlapped end portions of the straps retain the respective straps in relatively taut condition, so that the protector panel is in a tensioned condition on the door outer surface.

The strap or straps can act as handle(s) for holding and positioning the protector panel and flap on the door prior to door closure. When the door is closed, sections of the flexible flap and strap are clamped between edge areas of the door and the jamb surfaces which define the door opening. The protector panel is thus held in place by two separate mechansims: the magnetic means, and the flap-strap assembly.

The flap-strap assembly is so designed that prior to closure of the door the flap-strap assembly is already in its final position on the door. A particular aim of the invention is to ensure that persons having only average motor skills can manipulate and secure the flap-strap assembly in its final position, with relatively little effort and quite quickly.

Preferably, the flap (or flaps) is/are located on a line coincident with the vertical centerline of the protector panel, so that only one strap has to be manipulated at any given time. When the protector panel is in its final position, the flap-strap assembly is clamped in place at two points on the door: along the upper edge of the door, and along the lower edge of the door. The panel is thus firmly attached to the door and cannot readily be removed or disturbed by wind forces. Also, would-be thieves are deterred from lifting the protector panel away from the door surface. Accordingly such persons are less likely to consider the unauthorized removal of the bump protector from the automobile, as by cutting a strap and/or pulling the panel away from the door surface.

BRIEF DESCRIPTION OF THE DRAWINGS

FIG. 1 is a fragmentary side elevational view of an automobile with a bump protector of the inveniton installed thereon;

FIG. 2 is a fragmentary perspective view of two automobiles, showing a bump protector on one to cushion its door surface against being dented or nicked by the edge of a door of the other automobile;

FIG. 3 is a perspective view of a protector of the invention in a folded condition suitable for storage;

FIG. 4 shows the FIG. 3 bump protector unfolded for installation on an automobile door;

FIG. 4A is a perspective view of an automobile door in an opened condition with the FIG. 3 bump protector installed thereon;

FIG. 5 is a plan view of the protector of FIG. 4;

FIG. 6 s a view of the FIG. 5 protector taken from the opposite directoon and showing the other face of the protector panel;

FIG. 7 is a sectional view taken on line 7—7 in FIG. 5;

FIG. 8 is a view taken in the direction of FIG. 4, but showing a second embodiment of the invention;

FIG. 9 is a plan view of another embodiment of the invention; and

FIG. 10 is a sectional view taken on line 10—10 in FIG. 9.

DESCRIPTION OF A PREFERRED EMBODIMENT OF THE INVENTION

FIG. 1 shows an automobile 10 having a door 12 hingedly connected to the automobile body along its front edge 14. The door includes a lower steel portion 16 and an upper window area 17. Removably disposed on door 12 is a bump protector 19 according to the present invention.

Bump protector 19 comprises a flexible rectangular panel 20 having an upper edge 21, lower edge 22, and two side edges 23. Two flexible magnetic tapes 25 are contained within the panel for magnetically attaching the panel to the outer side surface of door 12. Each tape has a horizontal length only slightly less than the side-to-side dimension of panel 20, so that the panel is adhered to the door surface along the length of each of edges 21, 22. The panel is retainable on the door surface despite wind forces which tend to pull the panel away from the door surface.

Side edges 23 of the panel define an imaginary vertical centerline 27 equidistant from the side edges. A flexible flap 29 extends from the lower edge 22 of panel 20 at a central location along edge 22. Thus, flap 29 has side edges 30 spaced equidistant from the vertical extension of centerline 27, as seen in FIGS. 5 and 6. Side edges 30 of the flap are joined to an end edge 31 of the flap along two angulated convergent edges 33. End edge 31 is on a line coincident with the panel centerline 27.

An elongated flexible strap 35 extends from the end edge 31 of the flap along a line coincident with panel centerline 27. Strap 35 is long enough that when panel 20 is in place on the door outer surface, the strap can extend upwardly along the inner surface of the door and over the upper edge of the door, as shown in FIG. 4A. If desired, strap 35 may be looped about an interior door handle 36, as shown in FIG. 4A; such looping of the strap is not an essential feature of the invention.

Installation of the bump protector on the door may be accomplished by first positioniing panel 20 on the outer surfac of the door. Magnetic elements 25 will temporarily hold the panel on the door surface, with flap 29 hanging loosely downwardly below the door lower edge. Strap 35 can be pulled upwardly along the door inner surface to draw the flap upwardly about the door lower edge; the strap can then be looped over the upper edge of the door so that the end portion of the strap is located on or near the outer surface of window area 17 above panel 20. The free end of the strap can thereafter be grasped in one hand while a person uses the other hand to close the door. When the door is closed, the upper and lower edges of the door will clamp the strap and flap 29 against the associated jamb surfaces, thereby firmly retaining the bump protector in position on the door.

During the process of installing the bump protector on the automobile, the elongated strap 35 can be used as a handle to manipulate flap 29 around the lower edge of the door. The person does not have to physically grasp flap 29 or bend over to position flap 29 agains the door lower edge. After flap 29 is positioned against the door lower edge, strap 35 can be used as a pulling device to apply upward tension on flap 29 and downward tension on the lower edge of panel 20. One of the person's hands can exert a downward pull on the external end portion of the strap while the other hand grasps the upper edge 21 of panel 20. The panel 20 can thus be straightened and/or adjusted to an unwrinkled condition. Also, the flap and strap can be in tensioned conditions engaged with the respective door edges when the door is closed.

It will be noted that strap 35 and flap 29 are aligned with the panel vertical centerline 27, so that when the strap is pulled the tension forces are applied vertically and centrally to the flap and to the panel. The assembly includes a single strap, thus requiring that only one strap be manipulated or operated while the assembly is being tensioned or while the door is being closed.

Panel 20 may be formed in various ways. As shown in FIG. 7, the panel includes a fabric sheet 37 formed of a soft, durable and washable material such as corduroy, woven nylon cloth or canvas. Two flexible magnetic tapes 25 are positioned against the right face of sheet 37, after which a pad 39 of resilient cushion material, such as batting or foam rubber, is positioned over the tapes and sheet 37. The rightmost face of the panel may be formed by a covering sheet 40, of a calendered plastic material having a smooth outer surface. The panel components may be secured together by stitching and/or adhesives. The panel components are preferably flexible in order that the panel will conform to the curvature of the automobile door outer surface. In use of the protective panel, sheet 37 will be positioned against the door surface, and sheet 40 will form the exposed face of the panel.

FIG. 8 illustrates a second embodiment of the invention, the protective panel 20 and flap 29 of which are similar to the panel and flap components of the embodiment of FIGS. 4, 5 and 6. However, in the FIG. 8 arrangement two flexible straps are used in lieu of the single strap 35. A first strap 41 extends from flap 29, and a second strap 43 extends from the upper edge of panel 20. The two straps are of such length (e.g., thirty inches for each strap) as to have their terminal ends overlapped when the straps are disposed along the inner surface of an automobile door. The confronting faces of the overlapped strap ends have attachment devices thereon for connection of the straps. As shown in FIG. 8, the attachment devices comprise mating strips 45 and 47 of fibrous miniature hook and loop materials stitched or otherwise secured to the respective straps 41 and 43. Material for strips 45 and 47 is commercially available under the trademark VELCRO. Various types of attachment devices could be used for attaching the straps 41 and 43 together, e.g., mating snap fasteners, or buckles, or pressure-sensitive adhesives. The use of fibrous miniature hook and loop materials is preferred, because such materials can be locked together in a range of different positions of adjustment, thereby facilitating the tensioning of the straps.

In utulizing the FIG. 8 apparatus, panel 20 is positioned on the outer face of the automobile door. With the door open, strap 43 is loosely draped over the upper edge of the door. Strap 41 is then pulled upwardly along the door inner surface so as to position flap 29 around the doo lower edge. The two straps are pulled together to an overlapped condition along the door inner surface, after which the overlapped ends of the straps are pressed together so that the fibrous strips 45 and 47 interlock together, therey retaining the straps in position on the door. The straps will be in slight tension (not loose) when the door is closed to clamp against strap 43 and flap 29.

FIGS. 9 and 10 show a third embodiment of the invention, similar to the embodiment shown in FIGS. 4 through 6, except for the fact that non-flexible bar magnets in raised pockets 25a are used in lieu of the flexible magnetic tapes 25. As shown in FIG. 9, four bar magnets 49 are thus located within the protective panel 20 near the four corners of the panel. In most respects, the assembly of FIGS. 9 and 10 functions in a manner similar to the functioning of the device shown in FIGS. 1 through 6.

The bump protectors shown in the drawings utilize magnetic means for temporary positionment of the protective panel 20 on the automobile door. Additionally, a flap 29 and at least one associated strap (35 or 41, 43) are used for permanent retention of the panel on the door surface. Flap 29 is elongated in the side-to-side direction, so that an extensive flap area is presented to the lower edge of the door for firm, non-slip clamping of the flap between the door edge and jamb surface. The side-to-side dimension of the flap 29 is preferably greater than one half the side-to-side dimension of panel 20. The vertical dimension of the flap is at least seven inches to ensure that the flap will fully envelop the door lower edge.

Each embodiment of the invention employs a "single strap" design, i.e., a design wherein only one strap needs to be operated at any given point in time. With respect to the FIG. 8 embodiment, strap 43 can be positioned over the door upper edge prior to manipulation of strap 41, whereby sequential operation of the two straps is relatively easy and quick.

The strap designs are such that the flap and the straps can be held in tensioned conditions at the moment when the automobile door is closed. In the case of the FIG. 4 arrangement, the person exerts a slight pulling force on strap 35 while closing the door with a hand. In the case of the FIG. 8 arrangement, the interlocking fibrous strips 45 and 47 retain the straps in tensioned conditions while the door is being closed.

Thus there has been shown and described a novel vehicle side protector which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

I claim:

1. An automobile bump protector attachable to an automobile door, having an outer side surface, an inner surface, an upper edge, a lower edge and a thickness, comprising:

a flexible panel having an upper edge, a lower edge, and two side edges, said panel having a vertical centerline spaced equidistant from said side edges and including resilient cushioned pad means substantially coextensive in area with the panel, said panel further comprising first and second magnetic strips extending along upper and lower edge portions of the panel, each magnetic strip having such length as to extend across a substantial portion of the side-to-side dimension of the panel, a flexible flap extending from the lower edge of said panel for placement about the lower edge of the automobile door, said flap having two side edges spaced equidistant from an extension of the panel vertical centerline so that the flap has a centralized location along the lower edge of the panel, the side-to-side dimension of the flap being greater than one-half the side-to-side dimension of the panel, and the lengths of the flap side edges being substantially greater than the thickness of the automobile door, whereby the flap can cover the door lower edge and adjacent door side surfaces, said flap having a free end edge on an extension of the panel vertical centerline a substantial distance from the lower edge of the panel, and two corner edges extending in converging relation from the flap side edges to said free end edge, and a flexible strap extending from said end edge of said flap for disposition along the inner surface of the automobile door, said strap extending along a line that is an extension of the panel vertical centerline, such that the strap can be pulled to exert a centralized straightening force on the flap and panel.

2. A bump protector according to claim 1, wherein: said strap having a sufficient length to be extended upwardly along the inner surface of the automobile door and over the upper edge of the door.

3. A bump protector according to claim 1, and further comprising:

a second flexible strap extending from the upper edge of the panel along a line that is an extenson of the panel vertical centerline, said second strap having a sufficient length to be extendable over the upper edge oof the automobile door and downwardly along the door inner surface to overlap the first mentioned strap, whereby said straps can be attached together prior to closure of the door.

4. A bump protector according to claim 3, and further comprising:

strips of fibrous miniature hook and loop materials carried on overlapping surfaces of said straps, whereby the straps can be connected together prior to closure of the automobile door.

* * * * *